United States Patent
Gilbert et al.

(10) Patent No.: US 11,038,218 B2
(45) Date of Patent: Jun. 15, 2021

(54) EFFECTIVELY COOLED BATTERY ASSEMBLIES

(71) Applicant: FORD GLOBAL TECHNOLOGIES, LLC, Dearborn, MI (US)

(72) Inventors: Allen Joseph Gilbert, Grosse Ile, MI (US); Kristen S. Tamm, Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1157 days.

(21) Appl. No.: 15/145,313

(22) Filed: May 3, 2016

(65) Prior Publication Data

US 2017/0324126 A1 Nov. 9, 2017

(51) Int. Cl.
  *H01M 10/613* (2014.01)
  *H01M 10/643* (2014.01)
  (Continued)

(52) U.S. Cl.
  CPC .......... *H01M 10/613* (2015.04); *B60K 1/04* (2013.01); *B60K 6/28* (2013.01); *B60K 6/365* (2013.01); *B60K 6/40* (2013.01); *B60K 6/445* (2013.01); *B60K 11/02* (2013.01); *B60K 11/06* (2013.01); *H01M 10/625* (2015.04); *H01M 10/643* (2015.04); *H01M 10/647* (2015.04); *H01M 10/653* (2015.04); *H01M 10/654* (2015.04); *H01M 10/6554* (2015.04); *H01M 10/6556* (2015.04); *H01M 10/6568* (2015.04); *B60K 2001/005* (2013.01); *B60Y 2200/92* (2013.01); *B60Y 2306/05* (2013.01);
  (Continued)

(58) Field of Classification Search
  CPC . B60K 6/28; B60K 6/365; B60K 6/40; B60K 6/445; B60K 11/02; B60K 11/06; B60K 1/04; B60K 2001/005; B60Y 2200/92; B60Y 2306/05; B60Y 2400/112; H01M 10/613; H01M 10/625; H01M 10/643; H01M 10/647; H01M 10/653; H01M 10/654; H01M 10/6554; H01M 10/6556; H01M 10/6561; H01M 10/6568; H01M 2220/20; Y10S 903/907; Y10S 903/911; Y10S 903/951
  See application file for complete search history.

(56) References Cited

U.S. PATENT DOCUMENTS 6,146,786 A * 11/2000 Stadnick ............. H01M 2/0285
                                                   429/101
7,879,498 B2    2/2011 Chang et al.
(Continued)

*Primary Examiner* — Lingwen R Zeng
(74) *Attorney, Agent, or Firm* — David B. Kelley; Carlson, Gaskey & Olds

(57) ABSTRACT

This disclosure describes various embodiments of a battery assembly for an electrified vehicle battery pack. The battery assemblies include one or more battery cells (e.g., cylindrical, prismatic, or pouch cells) and a cooling device extending at least partially through the battery cells. The cooling device is configured to either conductively or convectively cool the battery cells. In some embodiments, the cooling device is a solid rod, a hollow tube, a slab, or some combination of these features. In other embodiments, the cooling device connects to a coolant manifold configured to communicate coolant for convectively cooling the battery cells of the battery assembly.

20 Claims, 7 Drawing Sheets

(51) Int. Cl.
  *H01M 10/647* (2014.01)
  *H01M 10/6554* (2014.01)
  *H01M 10/6568* (2014.01)
  *H01M 10/625* (2014.01)
  *H01M 10/6556* (2014.01)
  *B60K 6/365* (2007.10)
  *B60K 6/28* (2007.10)
  *B60K 6/445* (2007.10)
  *B60K 6/40* (2007.10)
  *H01M 10/654* (2014.01)
  *H01M 10/653* (2014.01)
  *B60K 1/04* (2019.01)
  *B60K 11/02* (2006.01)
  *B60K 11/06* (2006.01)
  *H01M 10/6561* (2014.01)
  *B60K 1/00* (2006.01)

(52) U.S. Cl.
  CPC .... *B60Y 2400/112* (2013.01); *H01M 10/6561* (2015.04); *H01M 2220/20* (2013.01); *Y10S 903/907* (2013.01); *Y10S 903/911* (2013.01); *Y10S 903/951* (2013.01)

(56) References Cited

U.S. PATENT DOCUMENTS

| | | | |
|---|---|---|---|
| 8,021,775 B2 | 9/2011 | Kaun | |
| 8,383,258 B2 | 2/2013 | Kim et al. | |
| 8,426,059 B2 | 4/2013 | Fuhr et al. | |
| 8,535,825 B2 | 9/2013 | Fuhr et al. | |
| 2003/0080036 A1* | 5/2003 | Nguyen | B01D 35/18 210/185 |
| 2010/0104936 A1* | 4/2010 | Meintschel | H01M 2/06 429/120 |
| 2010/0279159 A1* | 11/2010 | Meintschel | H01M 6/5038 429/94 |
| 2012/0171528 A1* | 7/2012 | Liu | H01M 10/6553 429/62 |
| 2012/0171551 A1* | 7/2012 | Kobayashi | H01G 9/016 429/158 |
| 2013/0115493 A1 | 5/2013 | Fuhr et al. | |
| 2013/0115505 A1* | 5/2013 | Xie | H01M 2/027 429/120 |
| 2013/0157089 A1* | 6/2013 | Miyatake | H05K 7/20509 429/72 |
| 2017/0102186 A1* | 4/2017 | Huang | F28D 15/0275 |

\* cited by examiner

SECTION A-A

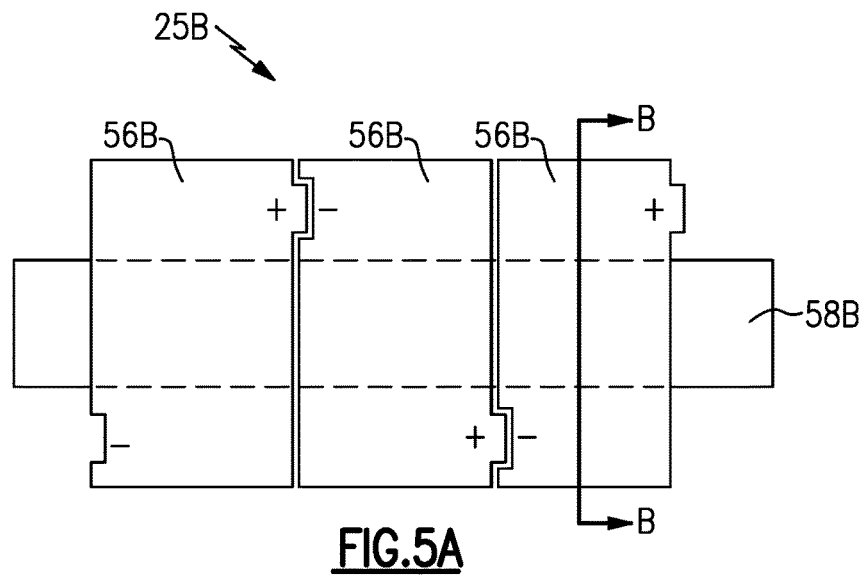
FIG.5A
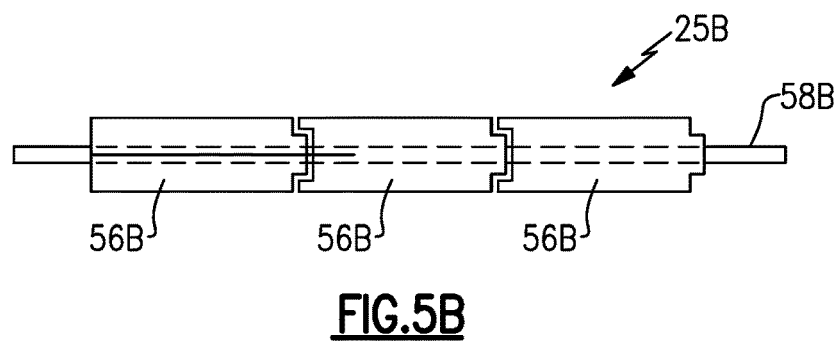
FIG.5B
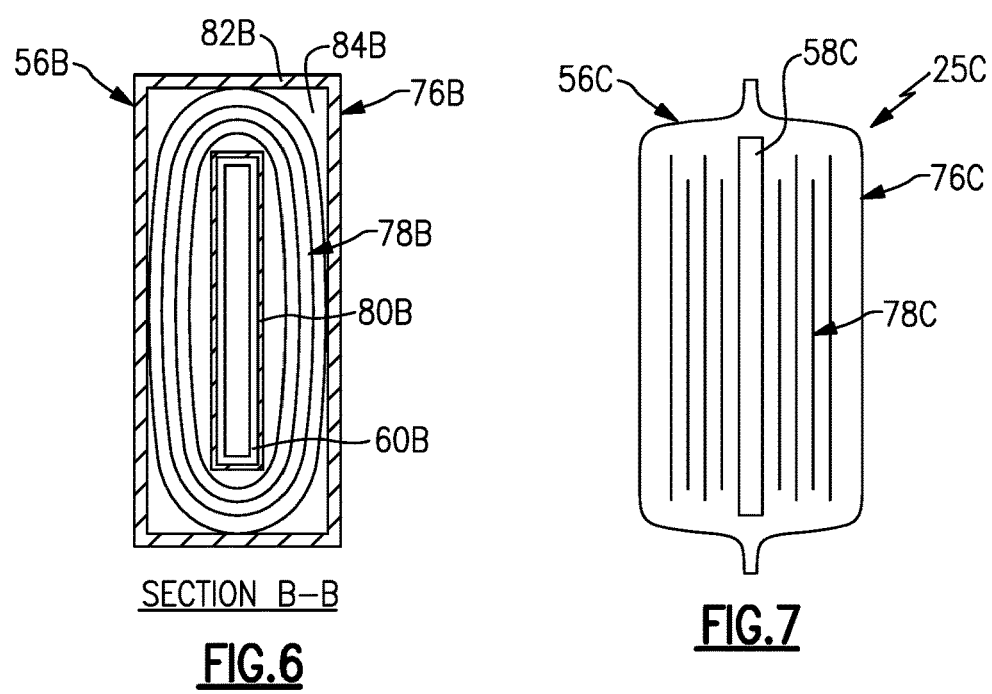
FIG.6
FIG.7

EFFECTIVELY COOLED BATTERY ASSEMBLIES

TECHNICAL FIELD

This disclosure relates to battery assemblies for electrified vehicle battery packs.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged to replenish the energy necessary to power these loads. The battery cells generate heat, such as during charging and discharging operations. Relatively complex thermal cooling systems are often employed to manage the heat generated by the battery cells.

SUMMARY

A battery assembly according to an exemplary aspect of the present disclosure includes, among other things, a battery cell, a cooling device extending at least partially through the battery cell, and a coolant manifold connected to the cooling device.

In a further non-limiting embodiment of the foregoing battery assembly, the cooling device is a solid metallic rod.

In a further non-limiting embodiment of either of the foregoing battery assemblies, the cooling device is a hollow metallic tube.

In a further non-limiting embodiment of any of the foregoing battery assemblies, the cooling device is a metallic slab.

In a further non-limiting embodiment of any of the foregoing battery assemblies, the cooling device extends through a void of the battery cell.

In a further non-limiting embodiment of any of the foregoing battery assemblies, the battery cell includes an inner wall and an outer wall, and the inner wall circumscribes the void.

In a further non-limiting embodiment of any of the foregoing battery assemblies, the coolant manifold includes an inlet on a first side of the cooling device and an outlet on a second side of the cooling device.

In a further non-limiting embodiment of any of the foregoing battery assemblies, the cooling device includes a threaded end that is received within a threaded opening of the coolant manifold.

In a further non-limiting embodiment of any of the foregoing battery assemblies, the cooling device is received within a fitting mounted to the coolant manifold. The cooling device and the fitting are connected using an interference fit.

In a further non-limiting embodiment of any of the foregoing battery assemblies, the cooling device extends through the battery cell and a second battery cell that is stacked against the battery cell.

In a further non-limiting embodiment of any of the foregoing battery assemblies, the battery cell is a cylindrical cell.

In a further non-limiting embodiment of any of the foregoing battery assemblies, the battery cell is a prismatic cell.

In a further non-limiting embodiment of any of the foregoing battery assemblies, the cooling device includes a plate, a first mandrel connected to a first side of the plate, and a second mandrel connected to a second side of the plate.

In a further non-limiting embodiment of any of the foregoing battery assemblies, the first mandrel and the second mandrel extend from a first position inside the battery cell to a second position outside of the battery cell. The first mandrel and the second mandrel contact either the coolant manifold or a thermal interface material (TIM) at the second position.

In a further non-limiting embodiment of any of the foregoing battery assemblies, the cooling device includes a plate disposed inside the battery cell and a thermal interface material (TIM) extension attached to the plate and extending outside of the battery cell.

A battery assembly, according to another exemplary aspect of the present disclosure includes, among other things, a battery cell including a can assembly having an inner wall and an outer wall, an electrode assembly housed between the inner wall and the outer wall, and a cooling device extending through a void of the can assembly. The void is circumscribed by the inner wall.

In a further non-limiting embodiment of the foregoing battery assembly, the battery cell is a cylindrical battery cell and the cooling device is a solid rod or a hollow tube.

In a further non-limiting embodiment of either of the foregoing battery assemblies, the battery cell is a prismatic battery cell and the cooling device is a metallic slab.

In a further non-limiting embodiment of any of the foregoing battery assemblies, the cooling device extends through a second void formed through a second battery cell.

In a further non-limiting embodiment of any of the foregoing battery assemblies, the second battery cell is positioned adjacent to the battery cell on the cooling device such that a positive terminal of the second battery cell contacts a negative terminal of the battery cell.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 5A and 5B illustrate a battery assembly according to a third embodiment of this disclosure.

FIG. 6 is a cross-sectional view through Section B-B of FIG. 5A.

FIG. 7 illustrates a battery assembly according to a fourth embodiment of this disclosure.

DETAILED DESCRIPTION

This disclosure describes various embodiments of a battery assembly for an electrified vehicle battery pack. The battery assemblies include one or more battery cells (e.g., cylindrical, prismatic, or pouch cells) and a cooling device extending at least partially through the battery cells. The cooling device is configured to either conductively or convectively cool the battery cells. In some embodiments, the cooling device is a solid rod, a hollow tube, a slab, or some combination of these features. In other embodiments, the cooling device connects to a coolant manifold configured to communicate coolant for convectively cooling the battery cells of the battery assembly. These and other features are discussed in greater detail in the following paragraphs of this detailed description.

Figure 1:
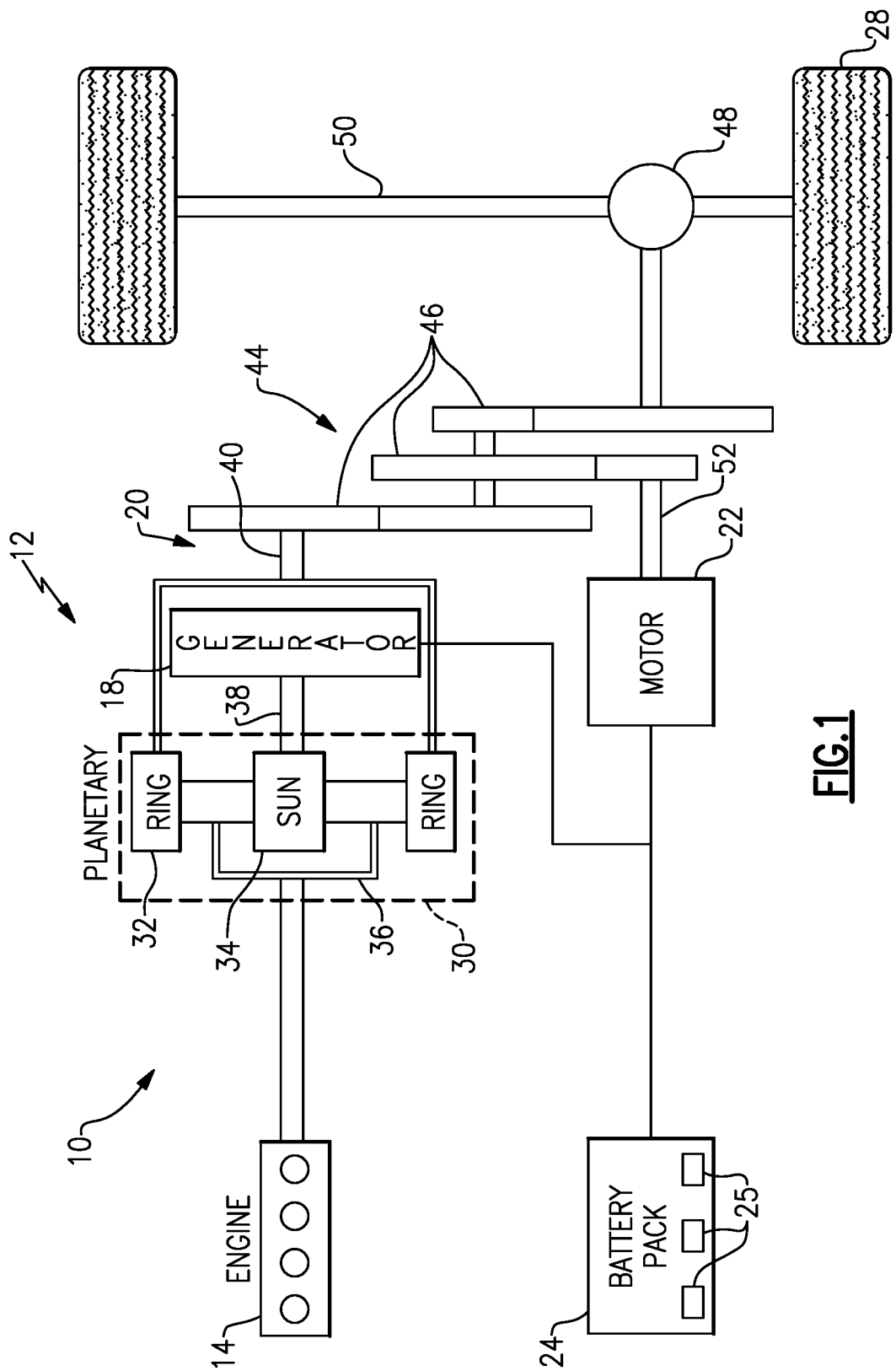
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2A:
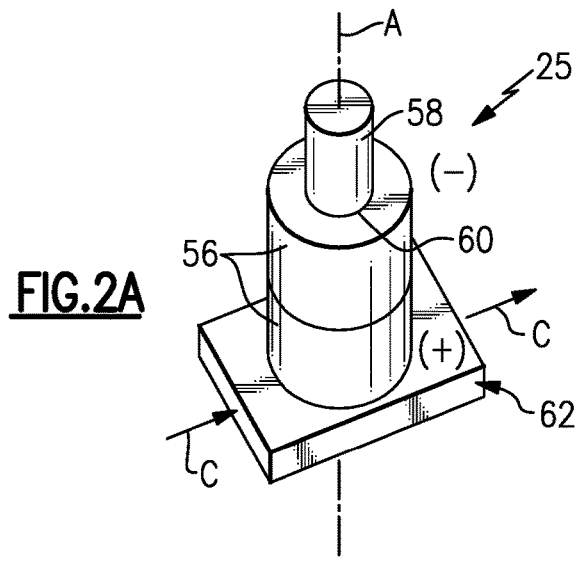
FIGS. 2A and 2B illustrate a battery assembly for an electrified vehicle battery pack.
Figure 2B:
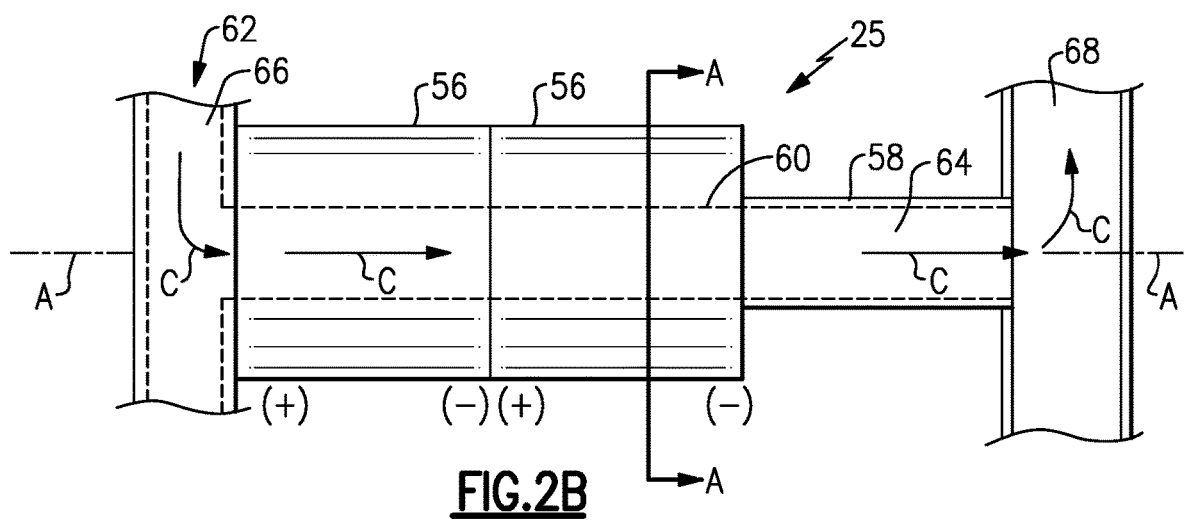

FIGS. 2A and 2B illustrate an exemplary battery assembly 25 that may be employed within an electrified vehicle battery pack, such as the battery pack 24 of the electrified vehicle 12 of FIG. 1, for example. The battery assembly 25 includes a plurality of battery cells 56 for supplying electrical power to various electrical loads of the electrified vehicle 12. Although two battery cells 56 are depicted in FIGS. 2A and 2B, the battery assembly 25 could employ a greater or fewer number of battery cells within the scope of this disclosure. In other words, this disclosure is not limited to the specific configuration shown in FIGS. 2A and 2B. The battery cells 56 may be stacked relative to one another along a longitudinal axis A to construct a grouping of battery cells 56, sometimes referred to as a "cell stack."

In a first non-limiting embodiment, the battery cells 56 are cylindrical, lithium-ion cells. However, this disclosure is not limited to cylindrical cells and could extend to cells having other geometries (prismatic, pouch, etc.) or other chemistries (nickel-metal hydride, lead-acid, etc.). Exemplary embodiments illustrating prismatic battery cells are shown in FIGS. 5A, 5B, 6, 8A, 8B, 9A, 9B, 10A and 10B, and an exemplary embodiment illustrating a pouch battery cell is illustrated in FIG. 7.

During certain conditions, heat is generated by the battery cells 56. It is desirable to manage this heat to improve capacity and life of the battery cells 56 and thereby improve the efficiency of the battery pack 24. Various features for actively managing this heat are therefore detailed in the embodiments described below.

The battery assembly 25 of FIGS. 2A and 2B includes a cooling device 58 disposed through voids 60 formed in the battery cells 56. The battery cells 56 can be slid onto the cooling device 58. The battery cells 56 and the cooling device 58 may engage one another in an interference fit. In a non-limiting embodiment, the cooling device 58 extends entirely through each battery cell 56 of the battery assembly 25. In other words, the voids 60 extend all the way through the battery cells 56.

Each battery cell 56 includes a positive terminal (designated by the symbol (+)) and a negative terminal (designated by the symbol (−)). In another non-limiting embodiment, the battery cells 56 are stacked on top of one another over the cooling device 58 such that each negative terminal is positioned adjacent to and contacts a positive terminal of a neighboring battery cell 56. Thus, in this embodiment, bus bars are not necessary to electrically connect the battery cells 56.

In a first non-limiting embodiment, the cooling device 58 is a solid rod (see FIG. 2A) made of a metallic material. The cooing device 58 could be covered with a thermal interface material that provides high thermal conductivity but high electrical isolation. In another non-limiting embodiment, the cooling device 58 itself is made of a TIM. In such embodiments, heat generated by the battery cells 56 is conducted from the battery cells 56 to the cooling device 58. The heat is then released to coolant C (e.g., air, water mixed with ethylene glycol, or some other fluid) that is communicated within a coolant manifold 62 connected to the cooling device 58. The coolant C carries the heat away from the battery assembly 25. In an alternative embodiment, the coolant manifold 62 is a solid device that acts as a cold plate to dissipate the heat.

In a second non-limiting embodiment, the cooling device 58 is a hollow tube (see FIG. 2B) made of a metallic material. In use, heat generated by the battery cells 56 is convectively transferred from the battery cells 56 to coolant C that is passed through a passage 64 formed through the cooling device 58. The coolant C carries the heat away from the battery assembly 25. The coolant C enters the passage 64 from an inlet 66 of the coolant manifold 62 and exits the passage 64 into an outlet 68 of the coolant manifold 62. In other words, the passage 64 is fluidly connected to both the inlet 66 and the outlet 68, which may be disposed at opposite ends of the cooling device 58, in a non-limiting embodiment. The coolant manifold 62, including the inlet 66 and the outlet 68, is part of a closed-loop system for communicating the coolant C through the battery assembly 25. Although not shown, the closed loop system may additionally include a coolant reservoir and a coolant pump.

Figure 2C:
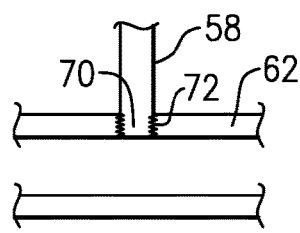
FIGS. 2C and 2D illustrate exemplary connections between a cooling device and a coolant manifold of the battery assembly of FIGS. 2A and 2B.
Figure 2D:
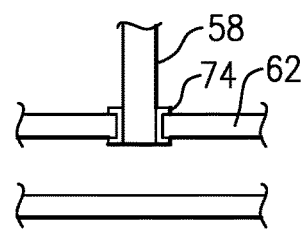

The cooling device 58 may be fluidly connected to the coolant manifold 62 of the battery assembly 25 to provide a sealed connection between these components. The battery cells 56 are removed from FIGS. 2C and 2D to better illustrate the connection between the cooling device 58 and the coolant manifold 62. In a first non-limiting embodiment, shown in FIG. 2C, the cooling device 58 includes a threaded end 70 that is inserted into a threaded opening 72 formed in the coolant manifold 62. In a second non-limiting embodiment, shown in FIG. 2D, the cooling device 58 is received within a fitting 74 mounted to the coolant manifold 62. The cooling device 58 and the fitting 74 may be sized to engage one another using an interference fit. Other connections between the cooling device 58 and the coolant manifold 62 are also contemplated within the scope of this disclosure.

Figure 3:
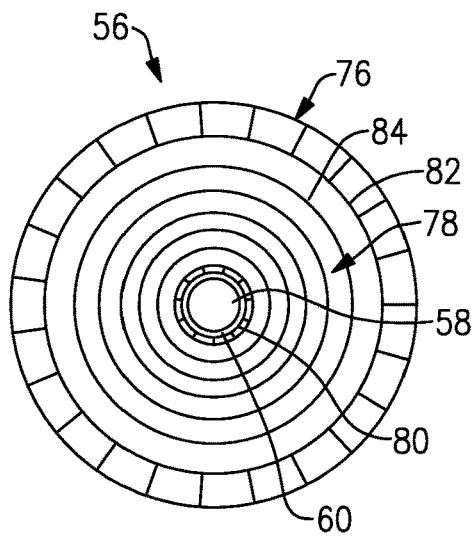
FIG. 3 is a cross-sectional view through Section A-A of FIG. 2B.

Referring now to the cross-sectional view of FIG. 3, each battery cell 56 includes a can assembly 76 and an electrode assembly 78 housed inside the can assembly 76. The can assembly 76 may include an inner wall 80, an outer wall 82 that generally circumscribes the inner wall 80, and a space 84 extending between the inner wall 80 and the outer wall 82 for receiving the electrode assembly 78. In this embodiment, the inner wall 80 and the outer wall 82 are cylindrical members. The electrode assembly 78, sometimes referred to as a jellyroll, is wound around the inner wall 80. The cooling device 58 passes through the void 60 of each battery cell 56. The void 60 is located through the center of the inner wall 80, and thus the inner wall 80 circumscribes the void 60 and the cooling device 58 and separates the electrode assembly 78 from the cooling device 58 once the cooling device 58 is received through the battery cell 56.

Figure 4:
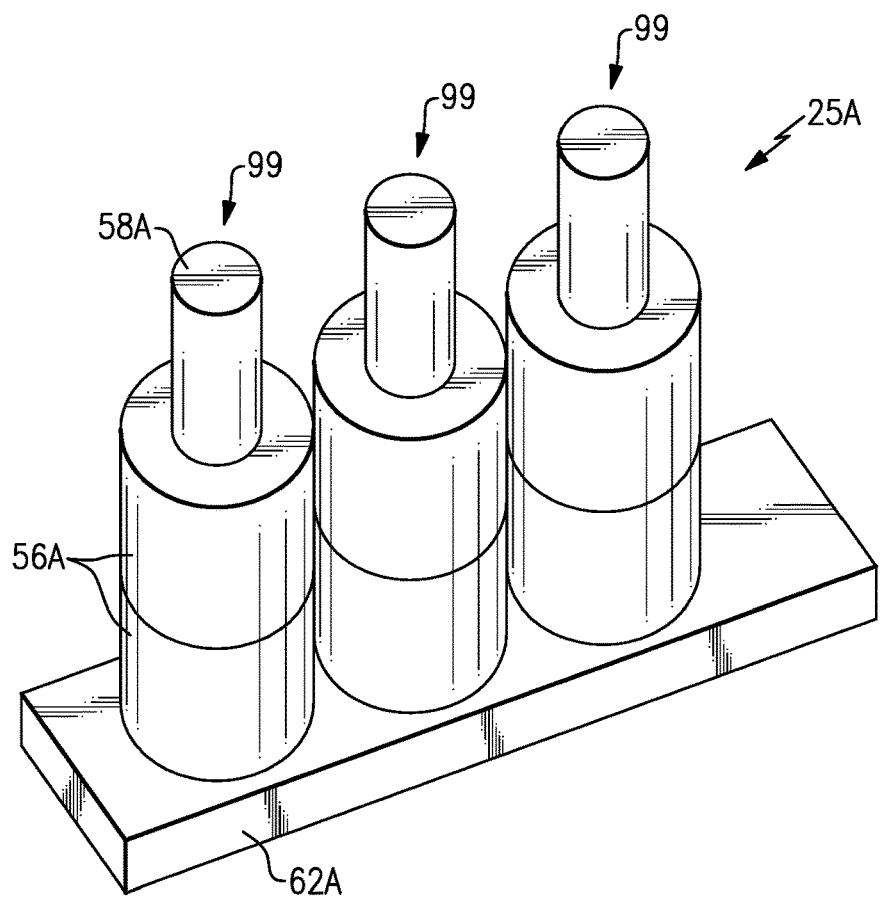
FIG. 4 illustrates a battery assembly according to a second embodiment of this disclosure.

FIG. 4 illustrates another exemplary battery assembly 25A. In this non-limiting embodiment, the battery assembly 25A includes multiple cell stacks 99 that each include cooling devices 58A received through a plurality of battery cells 56A. Each cell stack 99 is mounted to a coolant manifold 62A. This embodiment illustrates the scalable nature of the battery assemblies of this disclosure. The battery assemblies disclosed herein may be modified to include any number of battery cells and any number of cooling devices for achieving a desired level of energy density and cooling within the battery pack 24.

FIGS. 5A and 5B illustrate yet another battery assembly 25B. The battery assembly 25B includes a plurality of battery cells 56B and a cooling device 58B extending through each of the plurality of battery cell 56B. In this non-limiting embodiment, the battery cells 56B are prismatic, lithium-ion cells.

Each battery cell 56B includes a positive terminal (designed by the symbol (+)) and a negative terminal (designated by the symbol (−)). In a non-limiting embodiment, the battery cells 56B are stacked alongside one another over the cooling device 58 such that each negative terminal is positioned adjacent to and in contact with the positive terminal of a neighboring battery cell 56B. Thus, in this non-limiting embodiment, bus bars are not required to electrically connect the battery cells 56.

In a further non-limiting embodiment, the cooling device 58B is a metallic slab or plate received through the battery cells 56B. The cooling device 58B may be a solid metallic slab for conductively cooling the battery cells 56B, or could be a hollow metallic slab for convectively cooling the battery cells 56B.

Referring now to the cross-sectional view of FIG. 6, each battery cell 56B includes a can assembly 76B and an electrode assembly 78B housed inside the can assembly 76B. The can assembly 76B may include an inner wall 80B, an outer wall 82B that generally circumscribes the inner wall 80B, and a space 84B extending between the inner wall 80B and the outer wall 82B for receiving the electrode assembly 78B. In this embodiment, the inner wall 80B and the outer wall 82B are rectangular members. The electrode assembly 78B is wound around the inner wall 80B. The cooling device 58B passes through a void 60B of each battery cell 56B. The void 60B is located through the center of the inner wall 80B, and thus the inner wall 80B circumscribes the void 60B and the cooling device 58B and separates the electrode assembly 78B from the cooling device 58B once the cooling device 58B is received through the battery cell 56B.

FIG. 7 illustrates yet another exemplary battery assembly 25C. The battery assembly 25C includes a battery cell 56C and a cooling device 58C extending at least partially through the battery cell 56C. In this non-limiting embodiment, the battery cell 56C is a pouch cell. The battery cell 56C includes a can assembly 76C and an electrode assembly 78C housed inside the can assembly 76C. In a further non-limiting embodiment, the electrode assembly 78C is wrapped around the cooling device 58C once the cooling device 58C is received within the battery cell 56C. Although not shown, an insulating layer could be positioned between the electrode assembly 78C and the cooling device 58C to electrically isolate these components from one another.

Figure 8A:
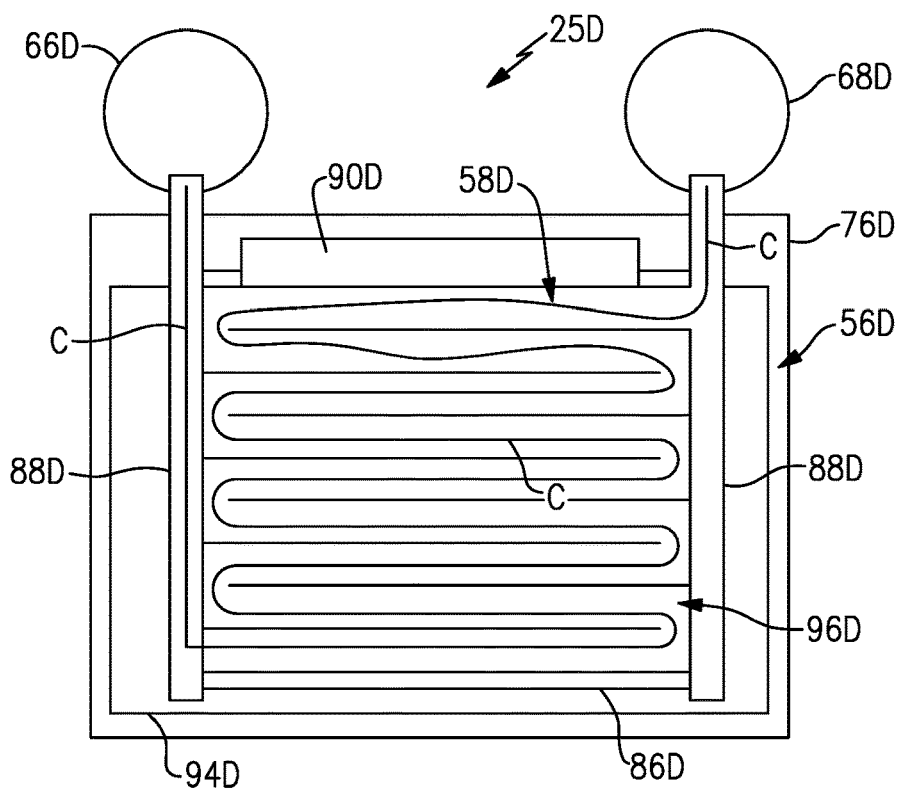
FIGS. 8A and 8B illustrate a battery assembly according to another embodiment of this disclosure.
Figure 8B:
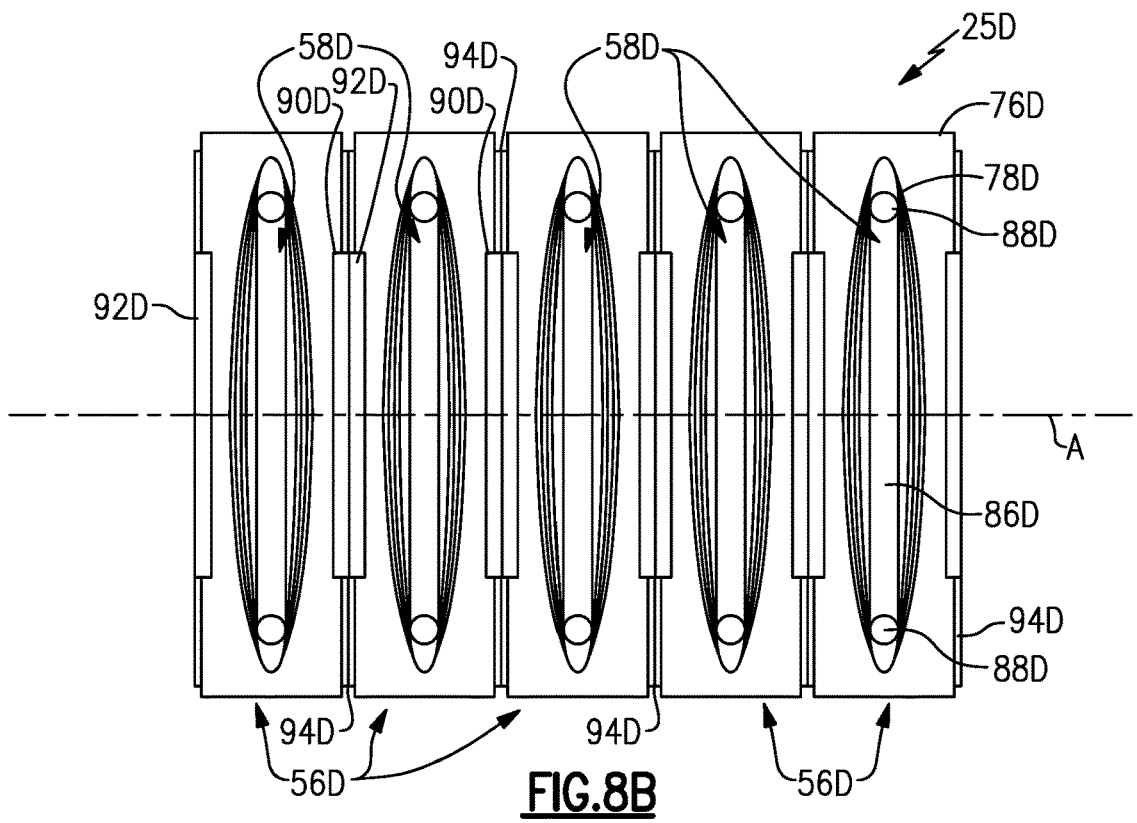

Another exemplary battery assembly 25D is illustrated in FIGS. 8A and 8B. The battery assembly 25D includes a plurality of battery cells 56D, which in this embodiment are configured as prismatic battery cells, and a plurality of associated cooling devices 58D. In this embodiment, each battery cell 56D includes its own cooling device 58D. In addition, unlike the prior embodiments, the cooling devices 58D of the battery assembly 25D only extend partially through the battery cells 56D.

The battery cells 56D are stacked side-by-side along a longitudinal axis A to construct the battery assembly 25D (see, for example, FIG. 8B). Each battery cell 56D includes a positive terminal 90D and a negative terminal 92D. In a non-limiting embodiment, the battery cells 56D are stacked side-by-side along the longitudinal axis A such that the negative terminals 92 are positioned adjacent to and in contact with positive terminals 90 of neighboring battery cells 56D. In a further non-limiting embodiment, a thermal interface material (TIM) 94D is positioned between adjacent battery cells 56D of the battery assembly 25D.

Each battery cell 56D includes a can assembly 76D and an electrode assembly 78D housed inside the can assembly 76D. The electrode assembly 78B may be wound around the cooling device 58D (best shown in FIG. 8B).

Each cooling device 58D may include a plate 86D and mandrels 88D connected to the plate 86D, for example at opposing ends of the plate 86D. In a non-limiting embodiment, the electrode assembly 78D of the battery cell 56D is wrapped around the cooling device 58D inside the can assembly 76D. The mandrels 88D, which are hollow tubes in this embodiment, extend from a first position inside the can assembly 76D to a second position outside of the can assembly 76D. One of the mandrels 88D connects to a manifold inlet 66D and the other of the mandrels 88D connects to a manifold outlet 68D at the second positions (see FIG. 8A).

Together, the plate 86D and the mandrels 88D establish a serpentine cooling passage 96D for directing coolant C through the cooling device 58D in order to convectively cool the battery cells 56D. For example, in use, coolant C is directed from the manifold inlet 66D into a first of the mandrels 88D (shown on left hand side of FIG. 8A). The coolant C is then directed through the serpentine cooling passage 96D before exiting into the manifold outlet 68D from the second of the mandrels 88D (shown in right hand side of FIG. 8A). Heat from the battery cells 56D is released to the coolant C as the coolant C is circulated along the pathway established by the serpentine cooling passage 96D.

Figure 9B:
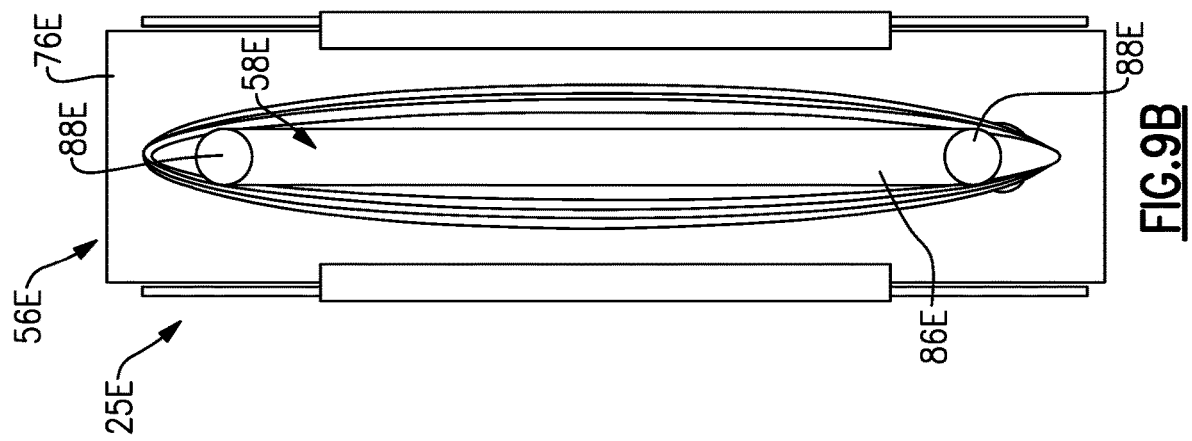
FIGS. 9A and 9B illustrate a battery assembly according to yet another embodiment of this disclosure.
Figure 9A:
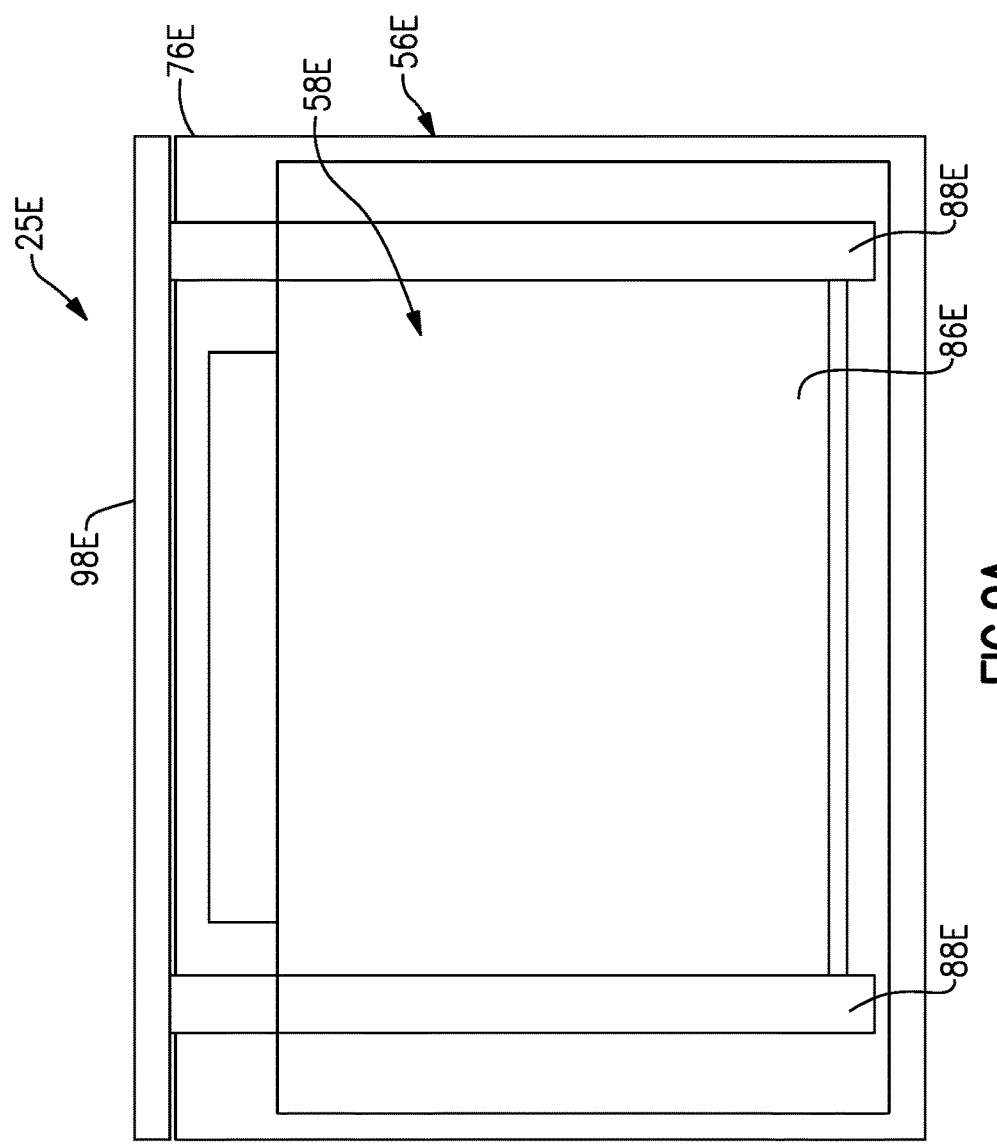

FIGS. 9A and 9B illustrate yet another exemplary battery assembly 25E for an electrified vehicle battery pack. Like the battery assembly 25D described above, the battery assembly 25E includes a cooling device 58E having a plate 86E and mandrels 88E for thermally managing heat expelled by a battery cell 56E. However, in this embodiment, the cooling device 58E conductively cools the battery cell 56E instead of convectively cooling it. The mandrels 88E, which are solid rods in this embodiment, extend outside of a can assembly 76E of the battery cell 56E and may contact a thermal interface material (TIM) 98E. The TIM 98E may be in contact with another structure, such as a cold plate or other heat sink.

Figure 10B:
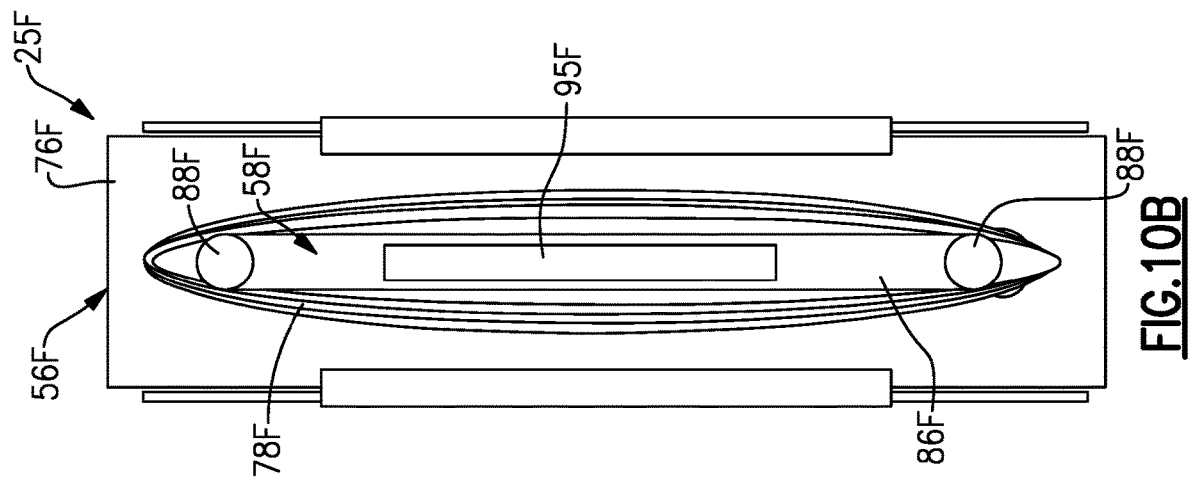
FIGS. 10A and 10B illustrate a battery assembly according to yet another embodiment of this disclosure.
Figure 10A:
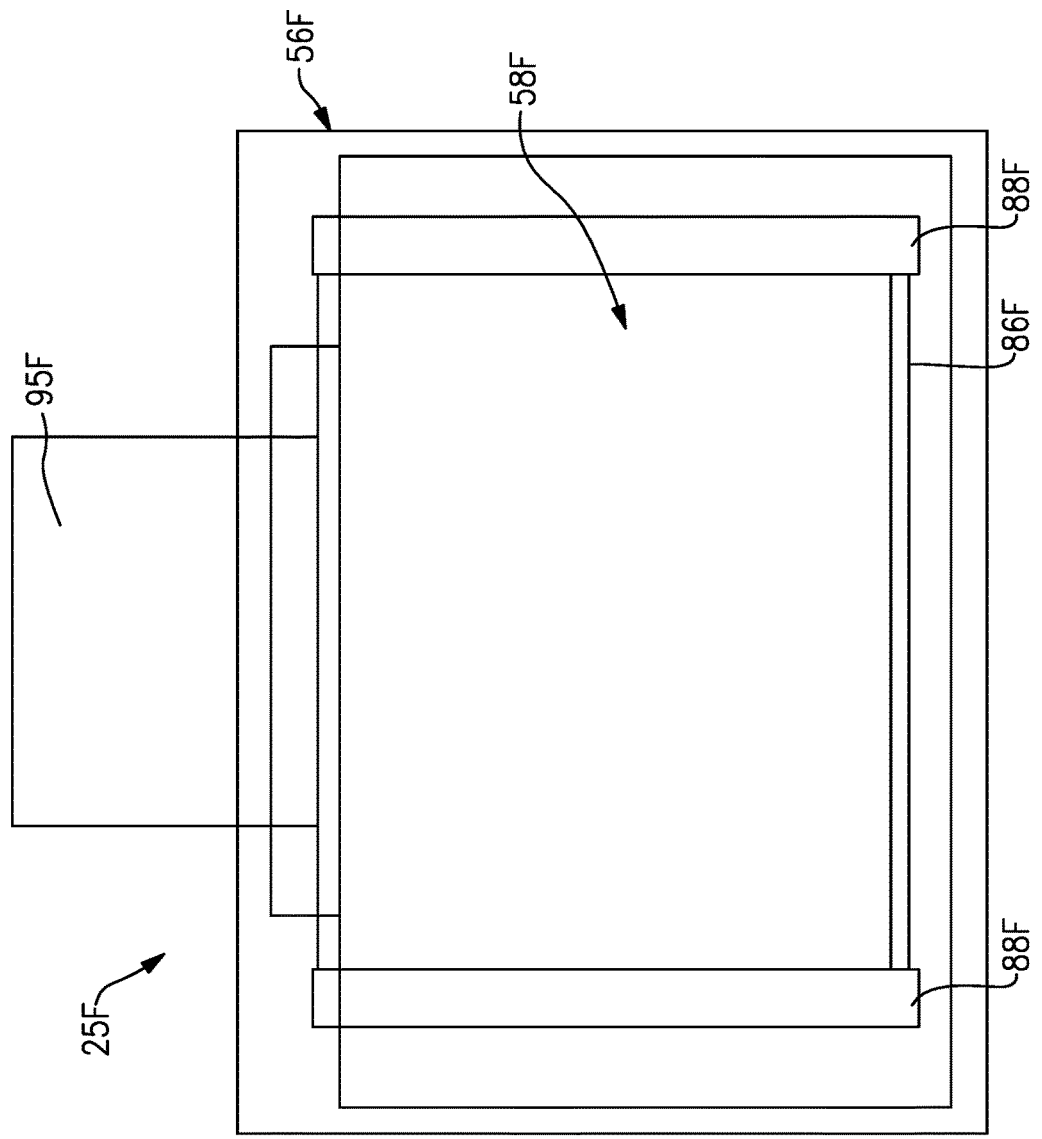

Yet another exemplary battery assembly 25F is illustrated in FIGS. 10A and 10B. The battery assembly 25F includes a cooling device 58F for cooling a battery cell 56F. The cooling device 58F extends at least partially through the battery cell 56F.

In a non-limiting embodiment, the cooing device 58F includes a plate 86F and mandrels 88F connected near opposing ends of the plate 86F. An electrode assembly 78F of the battery cell 56F is wrapped around the cooling device 58F inside a can assembly 76F of the battery cell 56F (see FIG. 10B). In a further non-limiting embodiment, the cooling device 58F includes a TIM extension 95F that is connected to the plate 86F. The TIM extension 95F protrudes from the plate 86F to a position outside of the can assembly 76F and may contact a cold plate or heat sink (not shown).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
a battery cell;
a second battery cell stacked against said battery cell, wherein each of said battery cell and said second battery cell includes a positive terminal and a negative terminal, wherein said positive terminal is positioned on a first surface of said battery cell or said second battery cell and said negative terminal is positioned on a second surface of said battery cell or said second battery cell, wherein said second surface is on an opposite side of said battery cell or said second battery cell from said first surface;

a cooling device extending at least partially through said battery cell and said second battery cell; and a coolant manifold connected to said cooling device, wherein said cooling device is a solid metallic rod, a hollow metallic tube, or a metallic slab.

2. The battery assembly as recited in claim 1, wherein said cooling device extends through a void of said battery cell.

3. The battery assembly as recited in claim 2, wherein said battery cell includes an inner wall and an outer wall, and said inner wall circumscribes said void.

4. The battery assembly as recited in claim 1, wherein said coolant manifold includes an inlet on a first side of said cooling device and an outlet on a second side of said cooling device.

5. The battery assembly as recited in claim 1, wherein said cooling device includes a threaded end that is received within a threaded opening of said coolant manifold.

6. The battery assembly as recited in claim 1, wherein said cooling device is received within a fitting mounted to said coolant manifold, said cooling device and said fitting connected using an interference fit.

7. The battery assembly as recited in claim 1, wherein said battery cell is a cylindrical lithium-ion cell or a prismatic lithium-ion cell.

8. A battery assembly, comprising:

a battery cell including a can assembly having an inner wall and an outer wall, the battery cell further including a positive terminal and a negative terminal, wherein said positive terminal is positioned on a first surface of said battery cell and said negative terminal is positioned on a second surface of said battery cell, wherein said second surface is on an opposite side of said battery cell from said first surface;

an electrode assembly housed between said inner wall and said outer wall; and a cooling device extending through a void of said can assembly, said void circumscribed by said inner wall, wherein said cooling device is a hollow metallic tube or a hollow metallic slab.

9. The battery assembly as recited in claim 8, wherein said battery cell is a cylindrical battery cell and said cooling device is said hollow tube.

10. The battery assembly as recited in claim 8, wherein said battery cell is a prismatic battery cell and said cooling device is said hollow slab.

11. The battery assembly as recited in claim 8, wherein said cooling device extends through a second void formed through a second battery cell.

12. The battery assembly as recited in claim 11, wherein said second battery cell is positioned adjacent to said battery cell on said cooling device such that said positive terminal of said second battery cell contacts said negative terminal of said battery cell.

13. The battery assembly as recited in claim 1, wherein said second battery cell is stacked against said battery cell such that said negative terminal of said second battery cell is in direct contact with said positive terminal of said battery cell.

14. The battery assembly as recited in claim 1, wherein said cooling device extends completely through a void formed through each of said battery cell and said second battery cell.

15. A battery assembly, comprising:

a first cell stack including a first cylindrical battery cell, a second cylindrical battery cell stacked against said first cylindrical battery cell, and a first single piece, metallic cooling rod or tube extending through a first void of said first cylindrical battery cell and a second void of said second cylindrical battery cell;

a second cell stack including a third cylindrical battery cell, a fourth cylindrical battery cell stacked against said third cylindrical battery cell, and a second single piece, metallic cooling rod or tube extending through a third void of said third cylindrical battery cell and a fourth void of said fourth cylindrical battery cell, wherein each cylindrical battery cell of said first cell stack and said second cell stack includes a positive terminal and a negative terminal, wherein said positive terminal is positioned on a first surface of said cylindrical battery cell and said negative terminal is positioned on a second surface of said cylindrical battery cell, wherein said second surface is on an opposite side of said cylindrical battery cell from said first surface; and a coolant manifold directly connected to both said first single piece, metallic cooling rod or tube and said second single piece, metallic cooling rod or tube, wherein said coolant manifold extends along a first longitudinal axis that is transverse to each of a second longitudinal axis of said first single piece, metallic cooling rod or tube and a third longitudinal axis of said second single piece, metallic cooling rod or tube.

16. The battery assembly as recited in claim 13, wherein a bus bar is not required to electrically connect said battery cell to said second battery cell.

17. The battery assembly as recited in claim 1, wherein said cooling device is a separate and distinct structure from said positive terminal and said negative terminal of each of said battery cell and said second battery cell.

18. The battery assembly as recited in claim 1, wherein said battery cell and said second battery cell are cylindrical lithium-ion cells.

19. The battery assembly as recited in claim 1, wherein said cooling device is covered with a thermal interface material.

20. The battery assembly as recited in claim 1, wherein said coolant manifold includes an inlet manifold connected at a first end of said cooling device and an outlet manifold connected at a second, opposite end of said cooling device.

* * * * *